June 21, 1949. P. R. GOLDMAN 2,473,875
TUBES, PIPES AND THE LIKE
Filed June 27, 1942
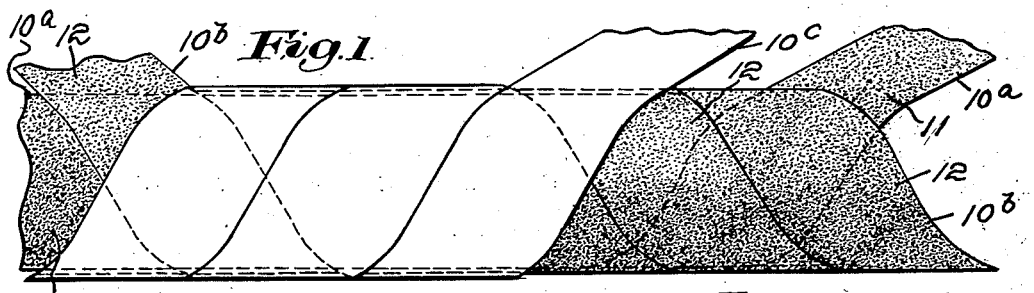
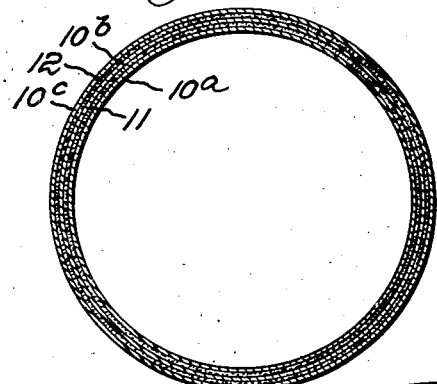
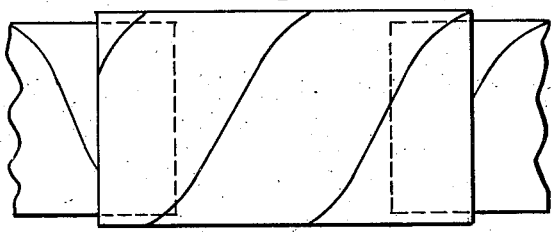
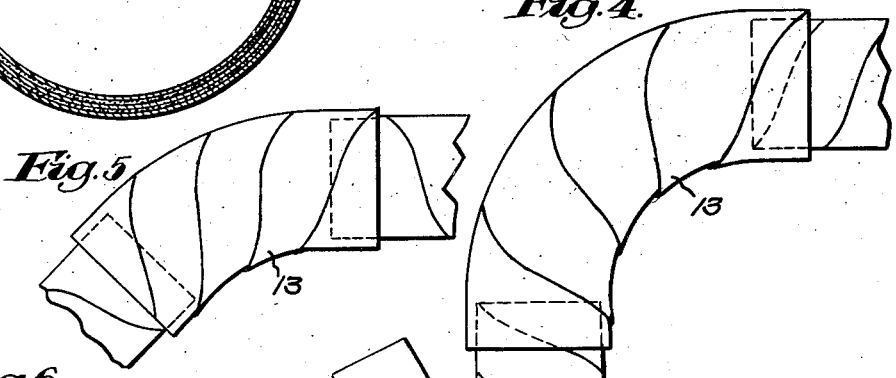
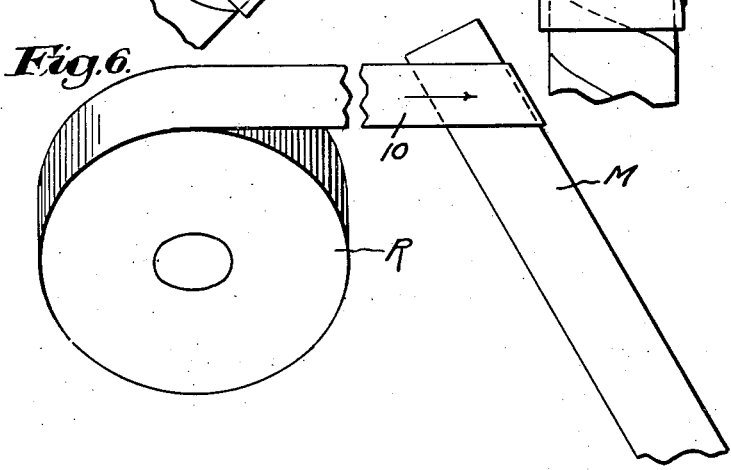
Inventor:
Paul R. Goldman
by Emery Booth Townsend Miller & Weidner
Attys.

Patented June 21, 1949

2,473,875

UNITED STATES PATENT OFFICE 2,473,875

TUBES, PIPES, AND THE LIKE

Paul R. Goldman, Andover, Mass., assignor to Plymold Corporation, Lawrence, Mass., a corporation Application June 27, 1942, Serial No. 448,819

2 Claims. (Cl. 138—79)

My present invention relates to the manufacture of spiral, cylindrical and other shaped tubular elements such as pipes, tubing, conduit, structural elements and the like and aims to provide new and improved means of the class described through the formation thereof or the incorporation therein of one or more layers or plies of plywood as an important or major constituent wall-forming material, together with novel and improved methods and processes of manufacturing the same.

In the drawings illustrating by way of example one embodiment of the invention and illustrating certain steps in the manufacture of the articles of the invention:

Fig. 1 shows in elevation a relatively short length or section of a pipe, tube, conduit or the like, with portions of the plywood strips extended, merely to facilitate the description;

Fig. 2 is a cross-section through a completed element such as that of Fig. 1;

Fig. 3 is an elevation showing one form of joint or fitting as appropriate for interconnecting successive lengths of my tubular material, in this instance in axial alignment or substantially so;

Figs. 4 and 5 are views similar to Fig. 3 showing fittings for angular joints between sections of the pipe or tubing, at angles of approximately 90° and 45° respectively; and Fig. 6 is a largely diagrammatic view illustrating a method of manufacture of the tubular material and elements such as those of Figs. 1 to 5.

As above indicated, the invention contemplates the provision of non-metallic tubular elements formed in part or wholly or mainly of strips of plywood. These tubular members may be of any desired length, diameter, wall thickness and cross-sectional shape. While in most instances this pipe, tubing, conduit and the like is of cylindrical form, it may be otherwise shaped, as of any desired polygonal form in cross-section adapted for production by spiral winding or helical manipulation of the base plywood strip material.

Referring first to Fig. 6 and the manufacturing method such as there typified, the plywood strip material 10 is prepared and supplied preferably in the form of a roll R, represented as rotatably supported to pay off the plywood strip. Such plywood forming strip 10 may itself consist of a single ply of the wood or of two or more plies superposed and preferably adhesively or otherwise bonded together in a manner to be referred to. Such plurality of plies may be laid and rolled together into a single supply roll R, or a corresponding number of individual single ply supply rolls R may be employed, rotatably mounted so that their leading ends may be run off into superposed relation.

The plywood strips 10 may be formed from any preferred or available wood stock, usually of the hardwood class, including such woods as birch, maple, mahogany, poplar, walnut and the like, although in certain instances softer woods such for example as some of the firs and even others commonly regarded as soft woods may be utilized. These plywood strips are prepared from the tree or timber stock in any known or preferred manner, such for example as in the production of veneer, as by slicing or knife-cutting, or by rotary cutting. Depending on the length and diameter of stock the plywood strips 10 may be prepared in various continuous lengths, up to as much as 40 to 50 feet or more for a single length, or shorter lengths of the plywood stripping may be joined together end to end as by taping and then wound into roll form such as indicated at R for feeding on or into the pipe or tube forming apparatus. In this manner substantially any available wood or lumber stock may be utilized in accordance with the method of the invention, by joining together endwise relative short lengths, such as 4, 6, 8, etc. feet of the plywood strips.

From the supply roll R of Fig. 6, or in some instances if desired directly from the plywood strip forming machine, the relatively thin strip material 10 is guided, as by means of rollers or the like, not shown, onto an elongated rotating former or mandrel M set with its longitudinal axis at an angle to the roll axis. By any suitable means not shown the leading free end of the strip 10 is caused to be wrapped or wound upon and about the mandrel so as to receive the form of a closed or substantially closed helix. The succeeding portions of the strip thereupon follow along continuously with its side edge portions in close relation or actual abutting contact in progressive succeeding spiral coils or turns. It will be understood that the spirally wound tubular element thus formed from the single or plural ply strip 10 advances bodily along and upon the rotating mandrel M, coming off at one end of the latter in a continuous-walled tubular form.

Following the formation of the initial or base layer or stratum of the plywood material, one or more additional layers or plies of the same or similar plywood strip material are spirally wound upon such first or inner tubular wall member. Such succeeding plywood strips may be helically wound in the same direction as the first or other layers, with each succeeding layer staggered or offset with relation to the adjacent ones or subject to a different angle or lead of spiral wind so that the spiral juncture lines along the side edges of the several strips do not come opposite each other. Preferably, however, and I have so illustrated the resultant tubular structure of Figs. 1 and 2, at least one plywood layer or stratum of the plurality is wound oppositely to the direction of wind of the underlying or the overlying layer, or both. Such reverse winding as between two or more of the plywood layers may be effected successively in separate winding machines, each having their mandrel such as M of Fig. 6, set to the appropriate angle and rotatably driven in the proper direction to afford the corresponding wind in one or the reverse directions. Or such reverse winding may be accomplished successively in a given machine, as by reversing the direction of mandrel rotation and appropriately feeding the plywood strip for spirally wound reception upon a previously wound helical tubular element.

In the course of the spiral formation of succeeding plywood tubular layers, the material of the plurality of strips is bonded together through the medium of an adhesive or other bonding agent such as certain glues, cements and the like. Such media or agents desirably are of a character to bond and receive an intimate union with the plywood strips, preferably with more or less of an impregnating action, so that the several layers upon completion present in effect a substantially unitary continuous tubular walled structure. The bonding agents in accordance with the invention also are selected with reference to the character of use of the resultant article and so that the latter is substantially resistant or proof against the action of heat, fire, water, cold, steam or other deteriorating or destructive actions to which iron, steel, copper, brass or other metal tubing, pipes, conduit and the like is ordinarily subject. Among such bonding and treating agents found well-suited to the purpose are glues and cements of the urea formaldehyde type, including those subject to application in a relatively cool state, as under normal atmospheric temperatures, and those of "Tego" type as adapted to aircraft construction, including such agent as available in sheet form and adapted for setting under the application of heat or of pressure or of both. In the instance of such latter agent it may be wound onto any of the spirally formed plywood layers either simultaneously with or subsequent to the winding of the latter, subsequent plywood layers being spirally applied in the presence of heat and pressure, or later subjected thereto, as by the provision of one or more heated or pressure rolls or a series thereof disposed to have rotative surface contact with the plywood tubing, during or after its winding formation. It will also be understood that the tubular plywood structure thus formed may additionally be treated for fireproofing and water-proofing purposes or otherwise so as to render it suitable for any of the uses commonly made of metal tubes and piping including not only conductive but also structural uses. The resultant tubular element such as that of Figs. 1 and 2 may be supplied in sections or lengths of any desired extent and may be cut to any convenient or appropriate standardized or other lengths.

Referring now more particularly to Figs. 1 and 2, the spirally wound plywood tubular element as there shown by way of example comprises an inner, initial or base strip or layer 10a having a given direction and angle of spiral wind of the order represented. Upon this initial ply or layer, and between it and the succeeding tubular wall portion, is provided the bonding agent as represented by the stippling at 11 in Fig. 1 and by the lining similarly numbered in Fig. 2. Over this inner spiral plywood winding 10a and in intimate contact with the bonding agent 11 there is spirally wound, with the opposite direction of wind, a second layer 10b of one or more plies of the wood stripping. Upon this intermediate layer 10b, between it and the herein outer layer 10c, there is likewise provided a layer or covering of bonding material as represented by the stippling at 12 and again by lining similarly numbered in Fig. 2. Said herein outer plywood strip 10c again is wound oppositely to the wind direction of the intermediate layer 10b, and hence in the generally similar direction of wind as for the inner layer 10a.

As previously stated the plywood strips may be spirally formed in superposed pairs or other pluralities. One construction which I have found appropriate to a wide generality of uses comprises two inner plywood strips wound in a given direction, followed by a plurality of two plywood strips oppositely wound, and over this a further pair of the plywood stripping elements wound in the direction as for the inner pair. All of these spiral wrappings of plywood are intimately bonded or adhesively secured together as in the manner already described. Depending on the diameter desired for the tubular structure and upon the total thickness of the resultant wall desired, the plywood strips may be of various thicknesses individually ranging from those as thin as $1/80$ to $1/100$ of an inch up to thicknesses of $1/32$ and more. In diameter the tubing, piping and the like as herein disclosed may range for the relatively smaller sizes of the neighborhood of 1 inch or somewhat less up to large tubular structures and conduits of substantially any size in which metal tubes, pipes and conduits are customarily supplied, including diameters as large as 16, 18 and 24 inches or even more.

As above indicated, the width of the plywood stripping, as well as the thickness, may be varied over a substantial range. The width is selected with reference to the diameter of the particular pipe or tube and to the angle of wind and other factors including those of lateral strength and rigidity. In the average instance with a spiral lead angle of say 45° substantially as in Fig. 1 which represents a typical or medium lead angle, the strip width is calculated as approximately equal to the internal diameter for the pipe or tube. Assuming for example that the tubular element of Figs. 1 and 2 is to have a 2 inch diameter, a 2 inch width for the plywood strip will be appropriate on the average. In general, overall strength varies inversely as the width of the strip, and also as the angle of spiral wind, with a given number of plywood strata.

Also as noted, the plywood as helically formed is laid with edges abutting or substantially so and generally at least two windings are employed, one reversed relative to the other so as to cross it angularly. For some structures and uses however, one or more of the strata may be wound with an overlap and with the overlapped portions bonded together, such formations being applicable to instances where but a single layer of the plywood may be found suited to the particular use. For most purposes the tubular elements of the invention are of uniform diameter, in the given size, but they may be formed with a tapered or other cross-sectional variation, the former or mandrel being correspondingly shaped for such result.

Joints between sections, in the installation of the tubular elements of my invention, may be provided as by tubular sleeves, joints or fittings such as illustrated in Figs. 3, 4 and 5 as respectively appropriate for straight-line and angular joints. These sleeves or fittings may be formed in the generally similar manner as for the pipe and tubing itself, the ends of the latter being inserted into the sleeves and there bonded and secured by the action of the glue or cement, appropriately conditioned to the extent necessary upon the job. In the formation of angular fittings such as those of Figs. 4 and 5 it will be understood that the spiral wrappings may be appropriately lapped, abutted or spaced as indicated therein at 13, and in accordance with the degree of curvature for the particular fitting or sleeve joint. As will be noted by a comparison of Fig. 4, in which the fitting has a relatively large longitudinal curvature, and Fig. 5 illustrating a less degree of curvature, the lateral overlapping of the spirally wound veneer strip material is proportionate to the degree of longitudinal curvature of the given sleeve fitting; it is also greater upon the convex or outer portion of the longitudinal curve than at the laterally opposite concave or inner portion of the curve to an extent also proportionate to the degree of the curvature.

From the foregoing it will be understood that my invention provides a novel structure and conduit element particularly appropriate to the present economic and war conditions and the materials for which are available, while the resulting means may be afforded all of the structural and other characteristics requisite in the use of metal tube and pipe for substantially all commercial, industrial and other purposes.

It will be understood that my invention, either as to means or method, is not limited to the exemplary embodiment or steps herein illustrated or described, and I set forth its scope in my following claims.

I claim:
1. As a new article of manufacture, a tubular curvilinear rigid sleeve fitting comprising a plurality of spirally wound concentrically superposed and interbonded wood veneer strips presenting a hollow and initially longitudinally curvilinear tube, at least one of the strips being spiralled oppositely to the next underlying strip and each strip being laterally overlapped upon itself continuously throughout each turn of each strip to a selected maximum axial extent in each turn proportionate to the longitudinal curvature for the given sleeve fitting as initially wound and to a greater axial extent at its concave than at its laterally opposite convex longitudinal portion by a lap differential also proportionate to the degree of said curvature as initially wound, and polymerized bonding means between adjacent strips and between self-overlapped portions of individual strips.

2. Wholly wound elongated hollow tubing units consisting of multiple plies of spirally wound thin wood veneer strips each of a continuous length substantially exceeding that of the given unit, each of a face-to-face gauge of approximately 0.010 to 0.031 in. and of a width approximating the inside diameter thereof, said plies mutually arranged to provide an inner core stratum of two such strips individually wound in a given spiral direction and having polymerized adhesive means interbonding them face to face, an intermediate stratum of two similar strips spirally wound oppositely to the core stratum and bonded thereto and to each other by polymerized adhesive means, and an outer stratum of two similar strips wound spirally in the direction of those of the core stratum and having polymerized adhesive means bonding them to the intermediate stratum and to each other, said at least six-ply multiplicity of paired strip plies in 2 x 2 x 2 relation presenting a wholly wound and substantially homogeneous tubular unit.

PAUL R. GOLDMAN.

REFERENCES CITED

The following references are of record in the file of this patent:

UNITED STATES PATENTS

| Number | Name | Date |
| --- | --- | --- |
| 278,957 | Heft | June 5, 1883 |
| 441,836 | Greenfield | Dec. 2, 1890 |
| 441,846 | Hurlbut | Dec. 2, 1890 |
| 534,564 | Macpherson | Feb. 19, 1895 |
| 784,909 | Westerling | Mar. 14, 1905 |
| 1,140,430 | Woodward | May 25, 1915 |
| 1,160,100 | Reynders | Nov. 9, 1915 |
| 1,228,099 | Dew | May 29, 1917 |
| 1,355,778 | Prior et al. | Oct. 12, 1920 |
| 1,894,341 | Becker | Jan. 17, 1933 |
| 1,942,468 | Andrews | Jan. 9, 1934 |
| 2,029,049 | Atwood | Jan. 28, 1936 |
| 2,247,197 | Graves | June 24, 1941 |
| 2,296,781 | Farney | Sept. 22, 1942 |
| 2,352,533 | Goldman | June 27, 1944 |
| 2,382,834 | Tynan | Aug. 14, 1945 |